(12) United States Patent
Puszkiewicz et al.

(10) Patent No.: US 11,099,972 B2
(45) Date of Patent: Aug. 24, 2021

(54) TESTING USER INTERFACES USING MACHINE VISION

(71) Applicant: Microsoft Technology Licensing, LLC, Redmond, WA (US)

(72) Inventors: Piotr M. Puszkiewicz, Seattle, WA (US); Diego Colombo, Farnham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/194,949

(22) Filed: Nov. 19, 2018

(65) Prior Publication Data

US 2020/0159647 A1    May 21, 2020

(51) Int. Cl.
*G06F 9/44* (2018.01)
*G06F 11/36* (2006.01)
*G06K 9/62* (2006.01)

(52) U.S. Cl.
CPC ...... *G06F 11/3664* (2013.01); *G06F 11/3612* (2013.01); *G06K 9/6256* (2013.01); *G06K 9/6268* (2013.01)

(58) Field of Classification Search
CPC .................................................. G06F 11/3664
USPC ....................................................... 717/125
See application file for complete search history.

(56) References Cited

U.S. PATENT DOCUMENTS

| | | | | |
|---|---|---|---|---|
| 5,781,720 A * | 7/1998 | Parker | .................. | G06F 11/3688 714/38.11 |
| 7,653,896 B2 * | 1/2010 | Herdeg, III | ......... | G06F 9/45512 717/113 |
| 7,974,714 B2 * | 7/2011 | Hoffberg | ............ | G06K 9/00369 360/75 |
| 8,775,428 B2 * | 7/2014 | Birdwell | .............. | G06K 9/6224 707/737 |
| 9,934,129 B1 * | 4/2018 | Budurean | ........... | G06F 11/3688 |
| 10,191,832 B2 * | 1/2019 | Zhang | .................. | G06F 11/3608 |
| 10,362,935 B2 * | 7/2019 | Dastmalchi | ............ | A61B 3/102 |
| 2008/0155515 A1 * | 6/2008 | Stewart | ............... | G06F 11/3664 717/135 |

(Continued)

FOREIGN PATENT DOCUMENTS

EP          3343378 A1    7/2018

OTHER PUBLICATIONS

"International Search Report and Written Opinion Issued in PCT Application No. PCT/US19/059575", dated Feb. 5, 2020, 10 Pages.

*Primary Examiner* — Evral E Bodden
(74) *Attorney, Agent, or Firm* — Fiala & Weaver P.L.L.C.

(57) ABSTRACT

Methods, systems, apparatuses, and computer program products are provided for validating a graphical user interface (GUI). An application comprising the GUI may be executed. A test script may also be executed that is configured to interact with the GUI of the application. Images representing the GUI of the application may be captured at different points in time, such as different interaction points. For each image, a set of tags that identify expected objects may be associated with the image. A model may be applied that classifies one or more graphical objects identified in each image. Based on the associated set of tags and the classification of the graphical objects in the image, each image may be validated, thereby enabling the validation of the GUI of the application.

20 Claims, 7 Drawing Sheets

(56) References Cited

U.S. PATENT DOCUMENTS

| | | | |
|---|---|---|---|
| 2010/0106732 A1* | 4/2010 | Atallah | G06F 16/907 |
| | | | 707/749 |
| 2014/0201027 A1* | 7/2014 | Bhardwaj | G06F 16/532 |
| | | | 705/26.7 |
| 2015/0212927 A1* | 7/2015 | N'Gum | G06F 11/368 |
| | | | 717/125 |
| 2016/0034383 A1 | 2/2016 | Duan et al. | |
| 2016/0267809 A1* | 9/2016 | deCharms | A61B 3/113 |
| 2018/0137025 A1* | 5/2018 | Zhang | G06F 11/3608 |
| 2018/0210824 A1 | 7/2018 | Kochura et al. | |
| 2019/0197220 A1* | 6/2019 | Anderson | G06F 11/3438 |
| 2020/0147299 A1* | 5/2020 | Piferi | A61B 5/4076 |

* cited by examiner

400

500

TESTING USER INTERFACES USING MACHINE VISION

BACKGROUND

During development of an application, a graphical user interface (GUI) generated by the application is typically tested to ensure its consistency with the developer's goals or intent. For example, the developer may intend that an application GUI comprise a particular visual appearance or respond to certain types of user interactions in an expected manner. However, an application GUI is not always consistent with the developer's goals, such as where bugs may be present in the code, or other unintended GUI behaviors occur that are discovered only upon testing the GUI.

Developers may utilize a number of techniques for testing the GUI of an application. One such way is by manually testing an application GUI against a variety of test scenarios. With this approach, however, significant delays are introduced during development of an application, which may result in reducing the scope or frequency of testing for the application. In another technique, images representing the GUI of an application may be extracted and compared to previously tested images to determine whether pixel differences exist between the images. With such a technique, however, relatively minor differences, such as color changes or other rendering differences between images representing the GUI may lead to many false positives. Furthermore, such a technique does not identify changes with sufficient granularity as individual pixel changes may result in a failed validation for an entire image, thus requiring additional time and resources for the developer to manually examine and/or address the reason for the failed result.

In another technique, test code may be executed that is tightly coupled to an in-memory representation of the GUI of the application to determine whether the in-memory representation is consistent with the developer's intent. Such a technique typically requires an understanding of structure of the GUI at the code level. Where a developer makes changes to the code, such as a restructuring of certain aspects of the code to make programming easier to debug or analyze, the test code may no longer match the representation of the GUI at the code level. As a result, even though the GUI may appear the same after such code changes, the test code is no longer applicable and therefore needs to be rewritten.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for validating a GUI. An application comprising the GUI may be executed. A test script may also be executed that is configured to interact with the GUI of the application. Images representing the GUI of the application may be captured at different points in time, such as different points of interaction. For each image, a set of tags that identify expected objects may be associated with the image. A model may be applied that classifies one or more graphical objects identified in each image. Based on the associated set of tags and the classification of the graphical objects in the image, each image may be validated.

In the above manner, the GUI of the application may be automatically validated to determine whether images representing the GUI of the application are consistent with the expected content (i.e., objects) in each image. For instance, objects on each image may be identified irrespective of their location on the image, thereby enabling the validation of an application's GUI in a dynamic fashion. In addition, the model used to classify objects for validation may be universal to a plurality of computing platforms, allowing the same model to be used across different systems.

Further features and advantages of the invention, as well as the structure and operation of various example embodiments, are described in detail below with reference to the accompanying drawings. It is noted that the invention is not limited to the specific embodiments described herein. Such embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
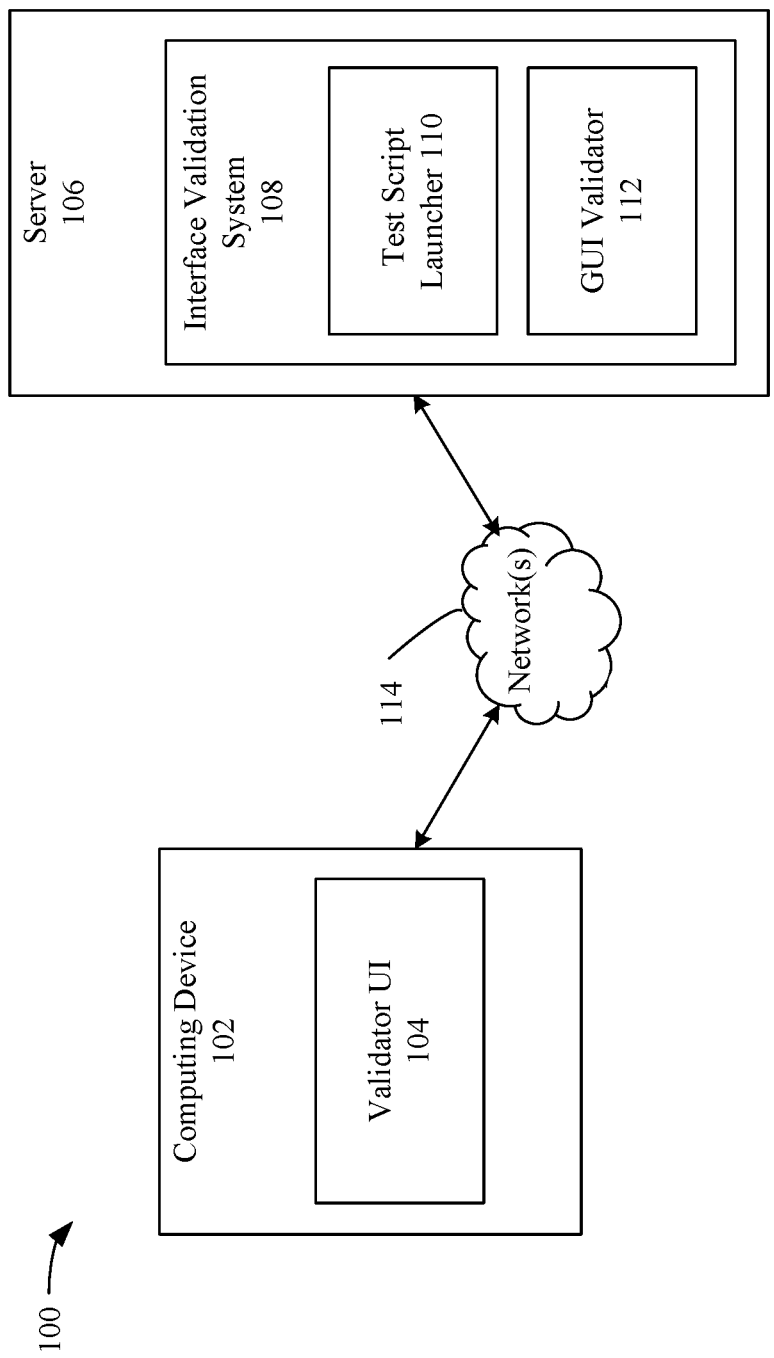
FIG. 1 shows a block diagram of system for validating a GUI of an application, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more example embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the example embodiment described may include a particular feature, structure, or characteristic, but every example embodiment may not necessarily include the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to effect such feature, structure, or characteristic in connection with other example embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the example embodiment for an application for which it is intended.

Numerous example embodiments are described as follows. It is noted that any section/subsection headings provided herein are not intended to be limiting. Example embodiments are described throughout this document, and any type of embodiment may be included under any section/subsection. Furthermore, example embodiments disclosed in any section/subsection may be combined with any other example embodiments described in the same section/subsection and/or a different section/subsection in any manner.

II. Example Implementations

As noted in the Background, during development of an application, a GUI generated by the application is typically tested to ensure its consistency with the developer's goals or intent. For example, the developer may intend that an application GUI comprise a particular visual appearance or respond to certain types of user interactions in an expected manner. However, an application GUI is not always consistent with the developer's goals, such as where bugs may be present in the code, or other unintended GUI behaviors occur that are discovered only upon testing the GUI.

Developers may utilize a number of techniques for testing the GUI of an application. One such way is by manually testing an application GUI against a variety of test scenarios. With this approach, however, significant delays are introduced during development of an application, which may result in reducing the scope or frequency of testing for the application. In another technique, images representing the GUI of an application may be extracted and compared to previously tested images to determine whether pixel differences exist between the images. With such a technique, however, relatively minor differences, such as color changes or other rendering differences between images representing the GUI may lead to many false positives. Furthermore, such a technique does not identify changes with sufficient granularity as individual pixel changes may result in a failed validation for an entire image, thus requiring additional time and resources for the developer to manually examine and/or address the reason for the failed result.

In another technique, test code may be executed that is tightly coupled to an in-memory representation of the GUI of the application to determine whether the in-memory representation is consistent with the developer's intent. Such a technique typically requires an understanding of structure of the GUI at the code level. Where a developer makes changes to the code, such as a restructuring of certain aspects of the code to make programming easier to debug or analyze, the test code may no longer match the representation of the GUI at the code level. As a result, even though the GUI may appear the same after such code changes, the test code is no longer applicable and therefore needs to be rewritten.

Embodiments described herein address these and other issues by providing a system for automatically validating a GUI of an application. A test script launcher may be provided to execute the application comprising the GUI for which validation is desired, as well as a test script that is configured to automatically interact with the GUI of the application. The test script launcher may further be configured to capture a plurality of images representing the GUI at different points in time, such as different points in time based on the automatic interaction with the GUI, and associate a set of tags for each image that identifies expected objects in the image. A GUI validator may apply a model that classifies one or more graphical objects detected in each image, and validate each image based on the associated set of tags and the classification of the graphical objects.

Validating a GUI in this manner has numerous advantages. For example, a GUI of an application in accordance with implementations may be validated in an automatic fashion while also increasing the accuracy of such validation. By implementing the GUI validation techniques described herein, graphical objects may be detected in images representing the GUI of an application at the object level, rather than engaging in processor intense activities, such as detection of changes in specific pixel values or analyzing in-memory representations of the GUI that may comprise many false positives (e.g., errors in validation in instances even where the GUI behaved as expected). By implementing an object-based validation that is continuously improved over time using a machine-learning based model, such false positives may be reduced, thereby minimizing the number of failed validation results that a human engineer may need to review. As a result, testing of GUIs may be conducted faster and more accurately, enabling final releases of computer applications to be released quicker and with fewer bugs.

Furthermore, example embodiments may enhance the GUIs of applications. For instance, by validating the GUIs of applications in a more accurate manner in accordance with the techniques described herein, developers may better ensure that the GUIs of applications released to the public are consistent with the developers' intent of the appearance and operation of the GUIs. For example, application bugs or other unexpected GUI issues may be tested and corrected in advance of an application's final release, ensuring that the application performs as expected and thereby enhancing an experience for consumers of the application.

Example implementations are described as follows that are directed to techniques for validating a GUI of an application. For instance, FIG. 1 shows a block diagram of an example system for validating a GUI of an application, according to an example embodiment. As shown in FIG. 1, system 100 includes a computing device 102 and a server 106, which are communicatively coupled by a network 114. Computing device 102 includes a validator user interface (UI) 104. Server 106 includes an interface validation system 108. Interface validation system includes a test script launcher 110 and a GUI validator 112. Interface validation system 108 is configured to validate a GUI of an application, such as an application under development, in accordance with techniques described herein. System 100 is further described as follows.

Network 114 may include one or more of a local area network (LAN), a wide area network (WAN), a personal area network (PAN), and/or a combination of communication networks, such as the Internet. Computing device 102 is communicatively connected to server 106 via network 114. In an implementation, computing device 102 and server 106 may communicate via one or more application programming interfaces (API), and/or according to other interfaces and/or techniques. In some other implementations, computing device 102 and server 106 (and subcomponents thereof) may communicate via one or more network calls (e.g., remote procedure calls), JavaScript Object Notation (JSON) over HyperText Transfer Protocol (HTTP) requests, reports, etc.

Computing device 102 and server 106 may each include at least one network interface that enables communications with each other over network 114. Examples of such a network interface, wired or wireless, include an Institute of Electrical and Electronics Engineers (IEEE) 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 may comprise any device configured to enable a user, such as a developer, to develop, test, and/or execute applications. In some example embodiments, validator UI 104 of computing device 102 may enable to a user to validate a GUI of an application, and/or access validation results of a GUI of an application, as will be described in greater detail below. In some example embodiments, computing device 102 may comprise computer programs, software, interfaces, or the like configured to enable a developer to design applications, view and/or modify source code, etc. relating to applications. Computing device 102 may also be configured to store, in a suitable storage device implemented in computing device 102 or located remotely, one or more versions of applications under development, and/or testing results of such applications. Computing device 102 may comprise a desktop computer, a portable computer, a smartphone, a tablet, or any other processing device for developing applications and/or validating a GUI of an application.

As shown in FIG. 1, interface validation system 108 comprises test script launcher 110 and GUI validator 112. In implementations, interface validation system 108 may implement machine vision techniques to automate the validation of a GUI of an application, such as an application under development. For instance, test script launcher 110 may cause an application for validation to be executed, as well as a test script configured to interact with the executed application. As described in greater detail below, the test script may interact with a GUI of the application. In some examples, the test script may comprise one or more automated interactions such as hovering over and/or clicking on interactive elements in the GUI via a pointing device interaction (e.g., a mouse), typing characters in the GUI, a voice-based interaction, a gesture-based interaction, or any other type of interaction resembling a user interaction of the GUI. In some examples, the interaction may be predetermined and/or may comprise one or more randomized interactions. Test script launcher 110 may also be configured to capture images representing the GUI at various points in time, such as before, during, and/or after one or more automated interactions, and associate a set of tags for each image. For instance, the set of tags for a given image may identify one or more objects that are expected to be in the image representing the GUI at a particular point in time or based on a particular interaction.

GUI validator 112 may be configured to apply each image to a model to classify one or more graphical objects identified in the image. For instance, each image may be analyzed to detect one or more graphical objects present in the image. Based on the detected objects, the model may be applied to classify the objects. In implementations, the model may comprise a machine-learning model that may be trained in a plurality of ways, including but not limited to a supervised and/or unsupervised learning algorithm, or a combination thereof. GUI validator 112 may be configured to validate each image based on the associated set of tags and the classification of the graphical objects identified in the image. In this manner, a GUI of an application, including various points in time representing different types of GUI interactions, may be validated to ensure consistency with the intent of an application developer.

Server 106 may include one or more server devices and/or other computing devices, co-located or located remotely, comprising, for instance, a cloud-based computing platform. In examples, server 106 may also be communicatively coupled to a storage or other repository (locally or remotely located to any of server 106). For instance, storage devices in accordance with implementations may include any type of physical storage device, including but not limited to one or more local storage devices, and/or one or more cloud-based storages, such as hard disk drives, solid state drives, random access memory (RAM) devices, etc. Such storage devices may be configured to store data, such as images representing a GUI of an application at various points in time. In implementations, the storage devices may be configured to store images in hundreds, thousands, millions, and even greater numbers. In implementations, the storage devices may also be configured to store images for a plurality of applications being validated, such as applications validated simultaneously, or a history of images for applications that were previously validated by interface validation system 108. Server 106 may comprise any suitable data structure for storing information and is not limited to any particular implementation or format.

Although interface validation system 108 may be implemented in server 106 as shown in FIG. 1, it is understood that interface validation system 108 may be implemented in or distributed across one or more servers shown in FIG. 1 or any additional devices or servers not shown. It is also noted that although computing device 102 is illustrated in FIG. 1 as being remotely located from server 106, implementations are not so limited. For instance, computing device 102 and server 106 may be co-located, may be implemented on a single computing device, or may be implemented on or distributed across one or more additional computing devices not expressly illustrated in FIG. 1. Furthermore, although FIG. 1 depicts a single computing device 102, it is understood that implementations may comprise any number computing devices (e.g., client devices) coupled to network 114 and server 106. An example computing device that may incorporate the functionality of computing device 102 and/or server 106 is described below in reference to FIG. 8.

Figure 2:
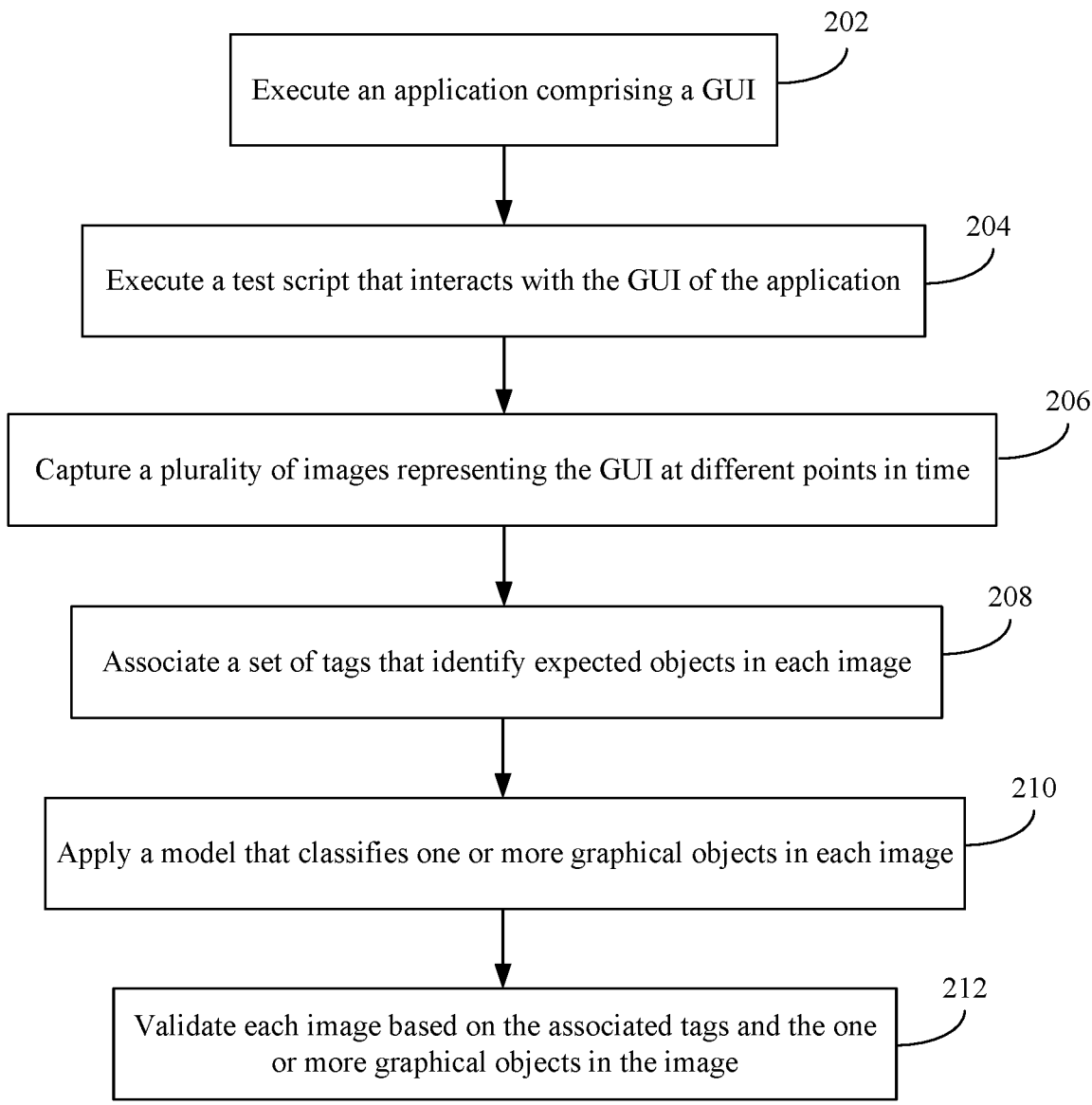
FIG. 2 shows a flowchart of a method for validating an interface of an application, according to an example embodiment.
Figure 3:
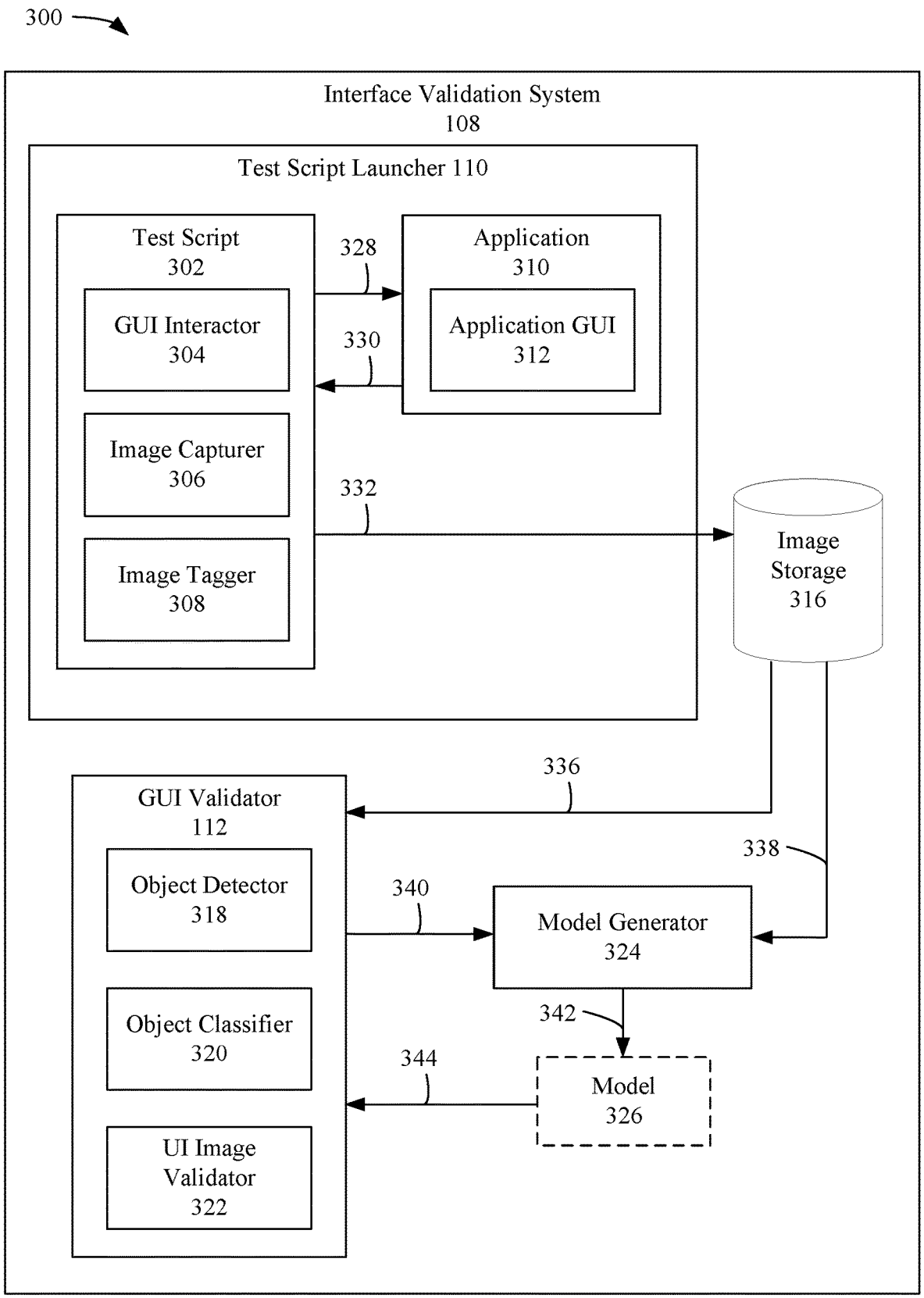
FIG. 3 shows a block diagram of an interface validation system, according to an example embodiment.

Interface validation system 108 may operate in various ways to validate a GUI of an application. For instance, interface validation system 108 may operate according to FIG. 2. FIG. 2 shows a flowchart 200 of a method for validating an interface of an application, according to an example embodiment. For illustrative purposes, flowchart 200 and interface validation system 108 are described as follows with respect to FIG. 3. FIG. 3 shows a block diagram of a validation system 300 for validating an interface of an application, according to an example embodiment. Validation system 300 is an example implementation of system 100 of FIG. 1. As shown in FIG. 3, system 300 comprises interface validation system 108. Interface validation system 108 comprises test script launcher 110 and GUI validator 112, as described with respect to FIG. 1. As shown in FIG. 3, interface validation system 108 also comprises an image storage 316, and a model generator 324 configured to generate a model 326. Test script launcher 110 may be configured to cause an execution of a test script 302 and an application 310. Test script 302 includes a GUI interactor 304, an image capturer 306, and an image tagger 308. Application 310 comprises an application GUI 312. As shown in FIG. 3, GUI validator 112 includes an object detector 318, an object classifier 320, and a UI image validator 322. Flowchart 200 and system 300 are described in further detail as follows.

Flowchart 200 of FIG. 2 begins with step 202. In step 202, an application comprising a GUI is executed. For instance, with reference to FIG. 3, test script launcher 110 may cause application 310 to be executed. In examples, application 310 may comprise software for execution on a local machine, such as a computing device described with reference to FIG. 8 below. In other examples, application 310 may comprise a cloud-based or web-based application, such as but not limited to a cloud-based or web-based application that may be executed in a web browser, such as Microsoft® Internet Explorer, Google® Chrome, Apple® Safari, etc. In one illustrative example, application 310 may comprise a programming application, such as code-based software editor that may be executed on a local machine or in a browser.

Test script launcher 110 may execute application 310 in an execution engine of server 106 or another computing device not shown. Application 310 may be executed across a plurality of nodes of server 106, or distributed across a plurality of servers, such as in a cloud-computing system. In some examples, application 310 may be executed in a virtual environment or in an emulator implemented on one or more computing devices.

As described above, application 310 comprises application GUI 312 that may enable, among other things, user interactions with application 310. Application GUI 312 may enable interactions with application 310 in a number of ways. Interactions via application GUI 312 include, but are not limited to, pointing device interactions, keyboard interactions, voice-based interactions, gesture-based interactions, or other types of user interactions. For instance, where application 310 comprises a code editor or other software editor application, application GUI 312 may receive interactions, such as keyboard interactions relating to certain types of codes or functions. Based on such keyboard interactions, application GUI 312 may present one or more completion options, such as one or more auto-complete options or auto-complete lists that when selected, automatically complete a character, string, phrase, or other task. Application GUI 312 may present completion options in a drop-down listing or the like that may be accessed and/or selected upon interactions with application GUI 312. In other examples, application GUI 312 may present one or more pop-up dialogs, windows, widgets, or other selectable options in response to receiving certain types of GUI interactions.

It is noted and understood, however, that graphical objects present in application GUI 312 are not limited to the above illustrative examples but may include any other types of selectable or non-selectable elements that may be displayed, including icons, buttons, lists, menus, toolbars, colors (e.g., background or foreground colors, or colors of any objects or elements described herein), etc. In some further examples, application GUI 312 may also include static GUI elements, such as an application name, a menu bar or a tool bar, a save element, an undo or redo element, a close button, etc. for which locations are not expected to change during execution of application 310. In other examples, however, GUI elements such as completion list elements or other selectable options (e.g., pop-up dialogs, windows, etc.) may be presented on application GUI 312 in dynamic locations. For instance, such elements may be presented in a location depending on the interaction received by application GUI 312. In the illustrative example of a completion list, the list may be provided in application GUI 312 in a location near a string or phrase for which the completion list is presented. As a result, application GUI 312 may comprise elements for which locations may differ depending on the type and location of received interactions.

In step 204, a test script that interacts with the GUI of the application is executed. For instance, with reference to FIG. 3, test script launcher 110 may execute test script 302. Test script 302 may comprise one or more test commands configured to interact with application GUI 312. For instance, as shown in FIG. 3, test script 302 may include GUI interactor 304 that interacts 328 with application GUI 312. In examples, GUI interactor 304 may include interactions that resemble or are otherwise intended to mimic an actual user behavior with application GUI 312.

GUI interactor 304 may interact with application GUI 312 in a number of ways, including but not limited to automating one or more interactions to be applied to application GUI 312. In some implementations, test script 302 may comprise one or more automated pointing device interactions, keyboard interactions, voice-based interactions, etc. Illustrative examples of such automated interactions include, but are not limited to, hovering over and/or clicking on interactive elements in application GUI 312 via a pointing device interaction (e.g., by sending commands to application GUI 312 to move a pointing device), typing characters or strings in application GUI 312, transmitting a voice-based interaction to application GUI 312, and/or any other type of interaction resembling a user interaction of the GUI. In some examples, the interaction may be predetermined and/or may comprise one or more randomized interactions.

Interactions to be applied by GUI interactor 304 may be predetermined or pre-written in some instances. For instance, a developer or tester of application 310 may identify a plurality of interactions to take place on application GUI 312 to validate whether application GUI 312 is performing as intended. In an illustrative example, GUI interactor 304 may comprise one or more interactions (e.g., typing a partial string or phrase or clicking on a certain area or element of application GUI 312) that are intended to cause application GUI 312 to present a completion list or other interactive element in response to the received interactions.

In some implementations, GUI interactor 304 may be configured to carry out a sequence of automated interactions to validate a plurality of functions of application 310. For example, GUI interactor 304 may transmit a first set of interactions for application on application GUI 312 to solicit a certain GUI response (e.g., a completion list), a second set of interactions to solicit a different GUI response (e.g., a pop-up dialog identifying a certain selectable widget), and so on. In this manner, GUI interactor 304 may be configured to test the conformity of application GUI 312 for various types of responses to interactions that resemble human behavior in an automated fashion.

In some other examples, GUI interactor 304 may be configured to implement one or more predetermined delays following interactions transmitted to application GUI 312. For instance, due to delays in processing or network-related delays, GUI interactor 304 may be configured to wait a certain period of time (e.g., 500 milliseconds) prior to transmitting subsequent interactions to ensure that such interactions may be accurately applied to application GUI 312.

GUI interactor 304 may also be configured to interact with application GUI 312 via one or more randomized interactions. For instance, GUI interactor 304 may move a pointing device on application GUI 312 in a random fashion to cause the GUI to respond in a partially unpredictable manner, such as by presenting a pop-up dialog at a location of the pointing device during the randomized interaction. In this way, while interaction may solicit a certain type of behavior from application 310 (e.g., by presenting an object representing a pop-up dialog, or other type of element discussed herein), the location of the on-screen object may appear in a random location. In other examples, such as with a completion list, randomized interactions may include typing in different characters or strings to solicit application GUI 312 to present a completion list. As a result, GUI interactor 304 may intentionally introduce noise into the automated interactions with application GUI 312 to further mimic actual user behavior in some implementations.

In step 206, a plurality of images representing the GUI at different points in time are captured. For instance, with reference to FIG. 3, image capturer 306 may capture 330 a plurality of images representing application GUI 312 at one or more points in time. Image capturer 306 may capture images as screenshots, or portions of screenshots representing application GUI 312 (e.g., a window or browser tab in which application GUI 312 is presented). In some other examples, image capturer 306 may perform a cropping option on one or more captured images to remove portions of the image that do not contain application GUI 312. In some other examples, image capturer 306 may compress each captured image, or may store captured images in a raw or uncompressed format.

As discussed, image capturer 306 may capture images at different points in time. For instance, image capturer 306 may capture images representing application GUI 312 at different interaction points based on GUI interactor 304. Captured images may represent an appearance of application GUI 312 before and/or after an interaction (or a set of interactions) intended to solicit a particular type of behavior by the GUI, such as the presentation of an object in response to a pointing device interaction, the presentation of a completion list in response to a keyboard interaction, etc. In this manner, image capturer 306 may capture images representing the behavior of application GUI 312 that may be used to validate whether application GUI 312 is performing in an intended fashion in response to various types of interactions.

In examples, image capturer 306 may store each captured image in a storage device, such as image storage 316. Image storage 316 may comprise any suitable storage device for storing hundreds, thousands, or even a greater number of images representing application GUI 312 (or a plurality of application GUIs). Although it is depicted in FIG. 3 that image storage 316 may be implemented in interface validation system 108, image storage 316 may be implemented in whole or in part outside of interface validation system 108, such as on a storage device that is remotely located from server 106 (e.g., one or more cloud-based storage devices).

In step 208, a set of tags is associated with each image that identifies the expected objects in the image. For instance, with reference to FIG. 3, image tagger 308 is configured to associate a set of tags with each captured image that identifies one or more objects that are expected to be present in the captured image representing application GUI 312 at a particular point in time. For example, image tagger 308 may determine that a certain interaction or set of interactions should result in one or more objects being displayed in application GUI 312 and associate the identification of such objects with the captured image representing the response of application GUI 312 to such interactions.

Image tagger 308 may associate the set of tags in a variety of ways. In one example, image tagger 308 may determine which objects are expected to be present in application GUI 312 at a given point in time or in response to certain interactions by querying application 310. For instance, image tagger 308 may interact with application 310 to determine or identify the objects that should be present in an image representing application GUI 312 at a particular instance. In some further implementations, image tagger 308 may be configured to interact with application 310 to identify a location, such as by identifying pixels, coordinates of pixels, relative locations of the GUI, etc. of each expected object. In some example embodiments, image tagger 308 may be configured to query an in-memory representation of application 310 to identify each expected object that should be present in application GUI 312 at a particular instance, and/or the expected object's location.

In some other examples, image tagger 308 need not query or otherwise reference application 310 to identify an association of expected objects for each captured image representing application GUI 312. For instance, image tagger 308 may associate expected objects in each image based on one or more predetermined associations in a test script. In one implementation, a test script (e.g., written by a developer in an example) may comprise the identifications of one or more objects expected to be present on the GUI in response to various interaction points, such as by associating a certain pop-up dialog that should be present in an image representing the GUI in response to a particular type of keyboard or pointing device interaction.

Therefore, test script 302 may be designed such that test script 302 is aware of the interactions that cause changes to application GUI 312, such as which interactions are intended to lead to application GUI 312 displaying particular graphical objects. As a result, test script 302 may be configured to cause GUI interactor 304 to interact with application GUI 312 via one or more types of interaction, cause image capturer 306 to capture an image representing application GUI 312, and cause image tagger 308 to associate one or more tags for the captured image that identify graphical objects that are expected to be present in each captured image.

In one non-limiting example provided for illustrative purposes, application 310 may comprise a GUI that changes a background color from a first color (e.g., gray) to a second or third color (e.g., green to blue) based on a pointing device interaction (e.g., a right or left click of a mouse). Test script 302 may be configured to execute the application and cause image capturer 306 to capture an image of application GUI 312 prior to transmitting any interactions. In this example, image tagger 308 may associate the captured image with a first color tag. Subsequently, GUI interactor 304 may transmit an appropriate pointing device interaction to application GUI 312 intended cause the background color to change to the second color. Image capturer 306 may capture an image of application GUI 312 upon such an interaction, and image tagger 308 may associate the tag corresponding to the second color tag with the second captured image. A similar process may be repeated for a second pointing device interaction, causing a capturing of a third image of application GUI 312 and associating the third image with a third color tag. In this manner, test script 302 may execute an application, interact with the application according to a test script, capture images of the application GUI at various interaction points, and associate each captured image with tags indicating graphical objects that may be present in the image.

Tags may be associated for each captured image in a number of ways. For example, each captured image may comprise metadata that includes a listing of tags associated with the image (e.g., a listing of objects expected to be present in the captured image). In other examples, the associated tags may be stored in one or more files corresponding to each image or a plurality of images, such as a text file, a spreadsheet or other database file, another image file, etc. that identifies the associated tags for each captured image. Implementations are not intended to be limited to these examples but may include any other suitable manner for associating images and tags that identify graphical objects expected to be present in the image. In example embodiments, upon associating tags with a captured image, image tagger 308 may store 332 the association in image storage 316.

In step 210, a model is applied that classifies one or more graphical objects in the image. For instance, with reference to FIG. 3, GUI validator 112 may be configured to obtain 336 a captured image and apply the captured image to model 326 to classify one or more graphical objects in the image. In implementations, model 326 may be configured to identify and/or classify one or more graphical objects that are actually present in each captured image. For example, model 326 may analyze an image using one or more suitable image analysis techniques known and appreciated to those skilled in the relevant art, to analyze each captured image to locate graphical elements present in the image, and classify such elements. As will be described in greater detail below, model 326 may comprise a machine-learning based model that is trained by model generator 324.

In one illustrative example described previously involving an application GUI that is configured to change colors based on a pointing device interaction, a first image (e.g., captured before any pointing device interaction is applied) may be applied to model 326. In such a scenario, model 326 may identify a background color as a graphical element and determine that the background color comprises a gray color. A similar procedure may be repeated for each captured image in the above illustrative example by applying each captured image to model 326.

In another illustrative example, a captured image representing a particular interaction point of application GUI 312 that comprises a plurality of on-screen objects, such as a menu, a completion list, a save button, a close button, etc. This captured image may be applied to model 326, which may analyze the image to identify and classify each object that is present in the image (i.e., the menu, completion list, save button, close button, and/or other elements present). In some further implementations, GUI validator 112 may also implement one or more optical character recognition (OCR) techniques to extract one or more alphanumeric characters from a captured image (or a subset thereof).

In this manner, GUI validator 112 may apply 344 model 326 to classify graphical objects in images in a dynamic fashion. In particular, because model 326 is configured to analyze elements at an object level, as opposed to a specific or exacting combination of pixels in application GUI 312, objects in a captured image may be identified and/or classified irrespective of the precise makeup of pixels and the location of such objects within the captured image. As a result, model 326 may accurately classify on-screen objects present in images representing application GUI 312 at various interaction points despite variations in appearance (e.g., size, colors, locations, etc.). In other words, model 326 may classify two graphical objects (e.g., appearing in the same image or in different images) as the same type of object even though such graphical objects may have a different visual appearance, appear in different locations on an image, or otherwise comprise other differences at a pixel level.

In step 212, each image is validated based on the associated tags and the one or more graphical objects in the image. For instance, with continued reference to FIG. 3, UI image validator 322 may be configured to validate each image based on the tags associated with the image that identify the expected objects in the image and the graphical objects in the image (e.g., as classified by model 326). UI image validator 322 may successfully validate an image, for example, where the tags associated with an image (e.g., identifying the expected objects in the image based on test script 302) match the graphical objects classified by model 326. In other words, where the objects that are intended to be in a particular image that represents a certain interaction point of application GUI 312 are consistent with the graphical objects that are actually identified and classified in the image, UI image validator 322 may successfully validate the image representing the particular interaction point of application GUI 312.

In the above illustrative example involving an application configured to change background colors, where a tag associated with a particular image (e.g., a first image) is a gray image tag, and model 326 classifies the background color as a gray background, UI image validator 322 may successfully validate the image. If, for instance, model 26 classifies the background color associated with the first image as a different color, UI image validator 322 may determine that the tag associated with the image does not match the graphical objects classified in the image and cause the validation for the particular image to be unsuccessful.

In another illustrative example discussed previously, if a particular set of tags associated with a captured image identifies a plurality of expected objects (a menu, a completion list, a save button, a close button), and model 326 classifies each such object in the image, UI image validator 322 may successfully validate the image. If, on the other hand, model 326 is able to classify only a subset of such objects in the image, UI image validator 322 may determine that the image representing application GUI 312 at the particular interaction point does not match the associated set of tags for the image, thereby resulting in a failed validation for the image.

In some implementations, UI image validator 322 may validate each image based on a measure of confidence. In an example, model 326 may be configured to identify a measure of confidence for each classified graphical object, such as a value representing a confidence that the graphical object has been classified accurately. For instance, UI image validator 322 may be configured to validate an image where each classified graphical object comprises a measure of confidence that exceeds a threshold (e.g., 90% or higher). If the measure of confidence of one or more graphical objects is below the threshold, UI image validator 322 may indicate that the validation of the image is unsuccessful. In some other examples, UI image validator 322 may indicate that the validation is successful for certain graphical objects that comprise a measure of confidence that exceed the threshold, and has failed for other graphical objects that were unclassified and/or comprise a measure of confidence below the threshold value. As a result, validation of GUI images may be achieved in a more granular fashion, enabling a developer to readily and precisely identify the particular characteristics of the GUI that passed and/or failed the validation. In implementations, the measure of confidence may be configurable or customizable by a developer via a suitable interface (e.g., validator UI 104).

UI image validator 322 may provide an output of a UI validation in a plurality of ways, including providing the result of each individual captured image, and/or providing an output representing validation of application 310 as a whole. For instance, where UI image validator 322 successfully validates each image representing each interaction point of application 310, UI image validator 322 may provide an indication, via a suitable interface such as validator UI 104, that application GUI 312 has successfully been validated. If UI image validator 322 failed the validation for any particular image of the plurality of images, UI image validator 322 may be configured to provide an indication that validation of application GUI 312, as a whole, has failed. In both examples, validator UI 104 may be configured to obtain, from GUI validator 112, additional information relating to the successful or failed validation, including but limited to results from one or more individual image validation results and any associated information (e.g., an identification of the associated tags indicating the expected objects in the image, the classified graphical objects and/or measures of confidence, etc.).

In example embodiments, UI image validator 322 may also enable model 326 to be continuously refined and/or retrained 340 based on the outcome of the validation of application GUI 312. For example, where a particular validation for application GUI 312 has failed, validator UI 104 may enable a user, such as a developer of application 310, to view the results of the validation, analyze one or more images validated by GUI validator 112, including but not limited to graphical objects classified by applying model 326, or any other information associated with validation of application GUI 312. Where a developer determines that a validation failure is erroneous (i.e., application GUI 312 should have been successfully validated by GUI validator 112), validator UI 104 may enable the developer to modify or correct the information that resulted in the erroneous validation. In some other examples, such as where the results of a validation are deemed correct or otherwise unaltered, model generator 324 may further refine model 326 based on the unaltered validation result. In this manner, model generator 324 may be configured to continuously retrain and/or refine model 326 based on user input (or lack thereof), thereby further improving the accuracy of the model and the automated validation of an application GUI.

Figure 4:
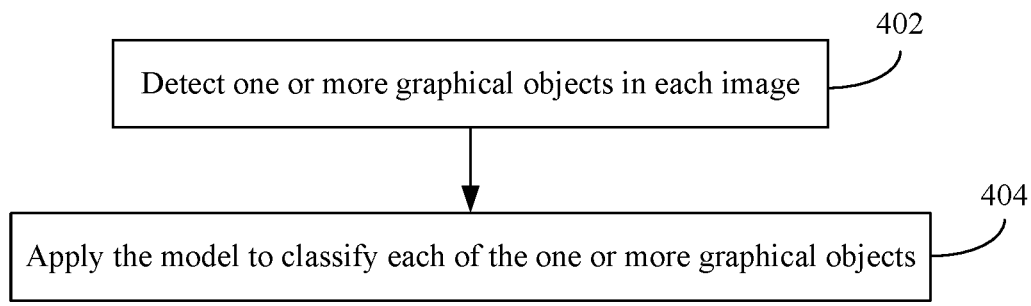
FIG. 4 shows a flowchart of a method for detecting and classifying graphical objects in an image representing a GUI of an application, according to an example embodiment.

As described above, graphical objects in an image representing an application GUI may be classified in various ways. For example, FIG. 4 shows a flowchart 400 of a method for detecting and classifying graphical objects in an image representing a GUI of an application, according to an example embodiment. In an implementation, the method of flowchart 400 may be implemented by GUI validator 112. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, one or more graphical objects are detected in each image. For instance, with reference to FIG. 3, object detector 318 may be configured to analyze each captured image (e.g., images captured by image capturer 306 representing application GUI 312) to detect graphical objects present in the image. In example embodiments, object detector 318 may be configured to detect the presence of any type of GUI element in an image representing application GUI 312 described herein, including but not limited to buttons, icons, lists, pop-up dialogs, colors, etc. Object detector 318 may implement one or more suitable image algorithm techniques for detecting the presence of graphical objects.

In some implementations, object detector 318 may be configured to detect the presence of graphical objects in each image without classifying each object. For instance, object detector 318 may be configured to identify each detected graphical object by coordinates, sets of coordinates (e.g., by bounding a box around each object), or any other suitable manner, and providing the location information of each detected object to object classifier 320 for classification as will be described later. In some other implementations, however, object detector 318 may also be configured to determine one or more preliminary classifications of each detected graphical object, such that the preliminary classification may be confirmed by object classifier 320 as described later. For example, object detector 318 may preliminarily determine that a particular detected object may be one of several types of GUI elements, and provide such preliminary classifications to object classifier. In a further example, object detector 318 may also implement a probability threshold or other confidence measure such that preliminary classifications exceeding the probability threshold are passed to object classifier 320 for confirmation. In accordance with implementations, such a probability threshold may be predetermined and/or may be modified or configured (e.g., via validator UI 104).

In step 404, the model is applied to classify each of the one or more graphical objects. For instance, as shown in FIG. 3, object classifier 320 may be configured to apply model 326 to classify each of the one or more graphical objects detected by object detector 318. As described above, object detector 318 may identify a relative location of each detected graphical object (e.g., by pixel coordinates or the like) for classification. In this manner, object classifier 320 may apply model 326 to each object present in the image for classifying. For example, if object detector 318 detects four separate graphical objects in a particular image representing application GUI 312, object classifier 320 may apply model 326 to each detected graphical object.

In some examples, object classifier 320 may be configured to perform a cropping operation on an image for each identified graphical object such that a cropped image (e.g., a portion of the overall image) representing each graphical object may be applied to model 326. Based on applying an image, or a portion of an image, to model 326, a classification of each graphical object may be determined. For instance, model 326 may be configured to identify the type of graphical object, colors present in the graphical object, or any other graphical characteristic associated with the graphical object such that the object may be appropriately labeled.

In example implementations, model generator 324 may comprise one or more suitable machine-learning algorithms for training 342 model 326 for classifying graphical objects. Model generator 324 may comprise any suitable classification algorithm, including but not limited to a cascading classifier, a linear classifier, a logistic regression algorithm, a Naive Bayes classifier, a support vector machine algorithm, a decision tree, a boosted tree, a random forest algorithm, a neural network algorithm, a nearest neighbor algorithm, or any combination thereof, as will be appreciated to those skilled in the relevant art.

In other implementations, object classifier 320 may implement one or more OCR models or techniques to extract a letter, number, word, phrase, string, etc. associated with graphical objects detected in captured images. For instance, test script 302 may cause GUI interactor 304 to interact with application GUI 312 in a manner to cause certain alphanumeric characters to be presented on application GUI 312, such as within one or more graphical objects. In such examples, image tagger 308 may be configured to tag captured images with a tag identifying expected text in the image, or within certain GUI elements that are expected to be present in the image representing application GUI 312. Object detector 318 may detect graphical objects on the captured image and object classifier 320 may classify the detected objects as described above. Upon classification, object classifier 320 may be configured to extract text from one or more classified objects and UI image validator 322 may compare the text expected to be present in the image (e.g., based on one or more associated tags) with the text extracted from the captured image. In this way, additional validation may be performed on images (or portions thereof) representing application GUI 312. It is noted that OCR techniques or models may be implemented as part of object classifier 320 or may be implemented separate from object classifier 320 in examples.

In some example embodiments, model generator 324 may train model 326, in part, based on a repository or catalog of training data. For instance, model generator 324 may train model 326 using a repository of associations of generic or commonly found graphical elements (e.g., save icons, close icons, menu bars, etc.) that may be present across a plurality of applications such that model 326 may more accurately classify graphical objects. In other examples, model 326 may also be trained based on one or more elements unique to a particular application GUI, as will be described later.

In implementations, object classifier 320 may be configured to apply model 326 to determine a single classification for each detected object. For example, object classifier 320 may classify a given graphical object based a confidence measure or the like representing the likelihood that a particular classification is accurate. In one illustrative example, model 326 may determine that a particular graphical object has a 55% probability of being accurately classified as an informational pop-up dialog, but a 99% probability of being accurately classified as a completion list. In such an example, therefore, object classifier 320 may classify the detected object based on the highest measure of confidence identified by model 326.

In a further example, model 326 may be configured to classify objects only where a measure of confidence exceeds a threshold value (e.g., a 90% confidence value) that may be predetermined and/or configurable in a similar manner as described above. Implementations are not limited to a single measure of confidence, but may also include a plurality of measures of confidence, such as different measures of confidence for different types of graphical objects. Where the measure of confidence does not exceed the threshold value, model 326 may be configured to ignore the graphical object, or classify the graphical object as an unknown or unclassifiable object.

By training model 326 using a wide variety of graphical object associations and classifying objects using a measure of confidence, model 326 may be enabled to better classify graphical objects even where the graphical object is not identical at the pixel level to a trained object association. In this manner, even where a particular graphical object comprises differences, such as different textual characters, different colors or shades, different relative locations on an image, etc., object classifier 320 may nevertheless be enabled to accurately classify such objects for use in validating application GUI 312.

Figure 5:
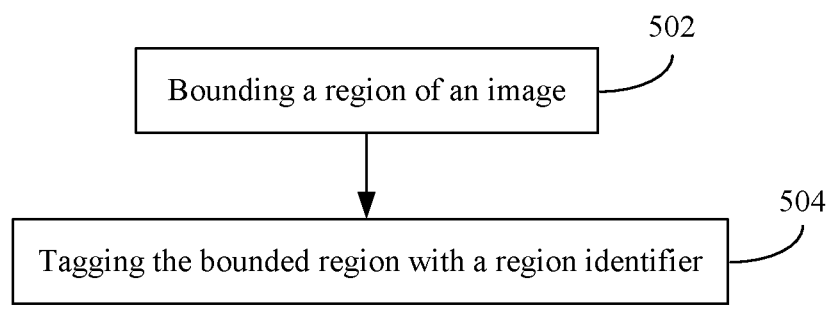
FIG. 5 shows a flowchart of a method for tagging a region of an image representing a GUI of an application, according to an example embodiment.

In example embodiments, model generator 324 may train model 326 in various ways. For example, FIG. 5 shows a flowchart 500 of a method for tagging a region of an image representing a GUI of an application, according to an example embodiment. In an implementation, the method of flowchart 500 may be implemented by test script 302 and/or model generator 324. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a region of an image representing an application GUI is bounded. For instance, with reference to FIG. 3, image tagger 308 may be configured to bound a region of one or more captured images representing application GUI 312 during execution of test script 302. In some implementations, image tagger 308 may be configured to bound a region of one or more such captured images during a training phase, such as during a first or initial validation of application GUI 312. In other words, during the first execution of test script 302 for application 310, image tagger 308 may be configured to bound one or more regions of captured images that represent locations of expected objects (e.g., GUI elements) in each image. Image tagger 308 may obtain locations of expected objects in each image, for instance, by querying or interacting with application 310 or an in-memory representation thereof. As an illustrative example, image tagger 308 may interact with application 310 to obtain an on-screen location for a particular GUI element (such as a completion list). Based on such on-screen location of the GUI element, image tagger 308 may bound the element in the captured image.

As described herein, bounding of an expected object in a captured image may include bounding a region with a box, circle, or any other shape, underlining a portion of the captured image, outlining or highlighting a region of the image where the object is expected to be present or any other manner of emphasizing a region of an image representing the location of an expected object. Each image captured by image capturer 306 at various points in time may comprise any number of bounded regions identifying locations of the expected objects in the image. For instance, a particular image may comprise zero bounded regions, a single bounded region, or a plurality (e.g., dozens or more) of bounded regions.

In step 504, the bounded region of the image is tagged with a region identifier. For instance, with reference to FIG. 3, image tagger 308 may be configured to tag each bounded region with a region identifier. The region identifier may comprise, for example, an identifier that identifies the expected object bounded by the region. In some instances, the region identifier may comprise an associated tag as described above, such as a tag that identifies an object that is expected to be present in an image representing application GUI 312 at a particular interaction point. Accordingly, in some implementations, image tagger 308 may obtain the region identifier associated with a particular region by similarly querying or interacting with application 310 as described herein.

It is noted and understood that implementations are not limited to bounding and tagging regions of images as described above. Rather, bounding and tagging of regions in images may also be carried out by identifying coordinates of an image that represent the region and an associated region identifier. For instance, image storage 316 may comprise a file associated with an image (such as a text file, a database file, or any other data structure) that identifies pixel coordinates or the like representing one or more regions where GUI elements are expected to be present in the image, along with a region identifier corresponding to the coordinates. In some examples, such information may be included as metadata within an image file that is stored in image storage 316. In implementations, validator UI 104 may utilize such region information and region identifying information to render appropriate overlays on an image representing the regions and their respective identifiers.

In implementations, the initial execution of test script 302 for application 310 may be carried out in a controlled manner to further improve accuracy. For instance, where the initial execution of test script 302 is carried out using a certain browser, resolution, operating system, etc., application 310 may be queried in a controlled manner such that the location and identifiers of expected objects on images representing application GUI 312 may be determined with a high accuracy. In this manner, therefore, a catalog of baseline training data (e.g., bounding of regions and tagging each region with a region identifier) that is likely to be accurate may be automated.

In some example embodiments, during a first execution of test script 302, validator UI 104 may provide a suitable interface through which computing device 102 may access captured images stored in image storage 316, along with associated regions and region identifiers. In such a scenario, validator UI 104 may enable a user (e.g., a developer) to bound one or more regions of each captured interface instead of, or in addition to, regions bounded by image tagger 308. In some other examples, validator UI 104 may provide an interface through which one or more regions bounded by image tagger 308 may be accessed and/or modified. For instance, validator UI 104 may provide one or more interactive user controls that enable a user to view, delete, add, move, and/or otherwise modify bounded regions and associated region identifiers for an image representing application GUI 312.

Figure 6:
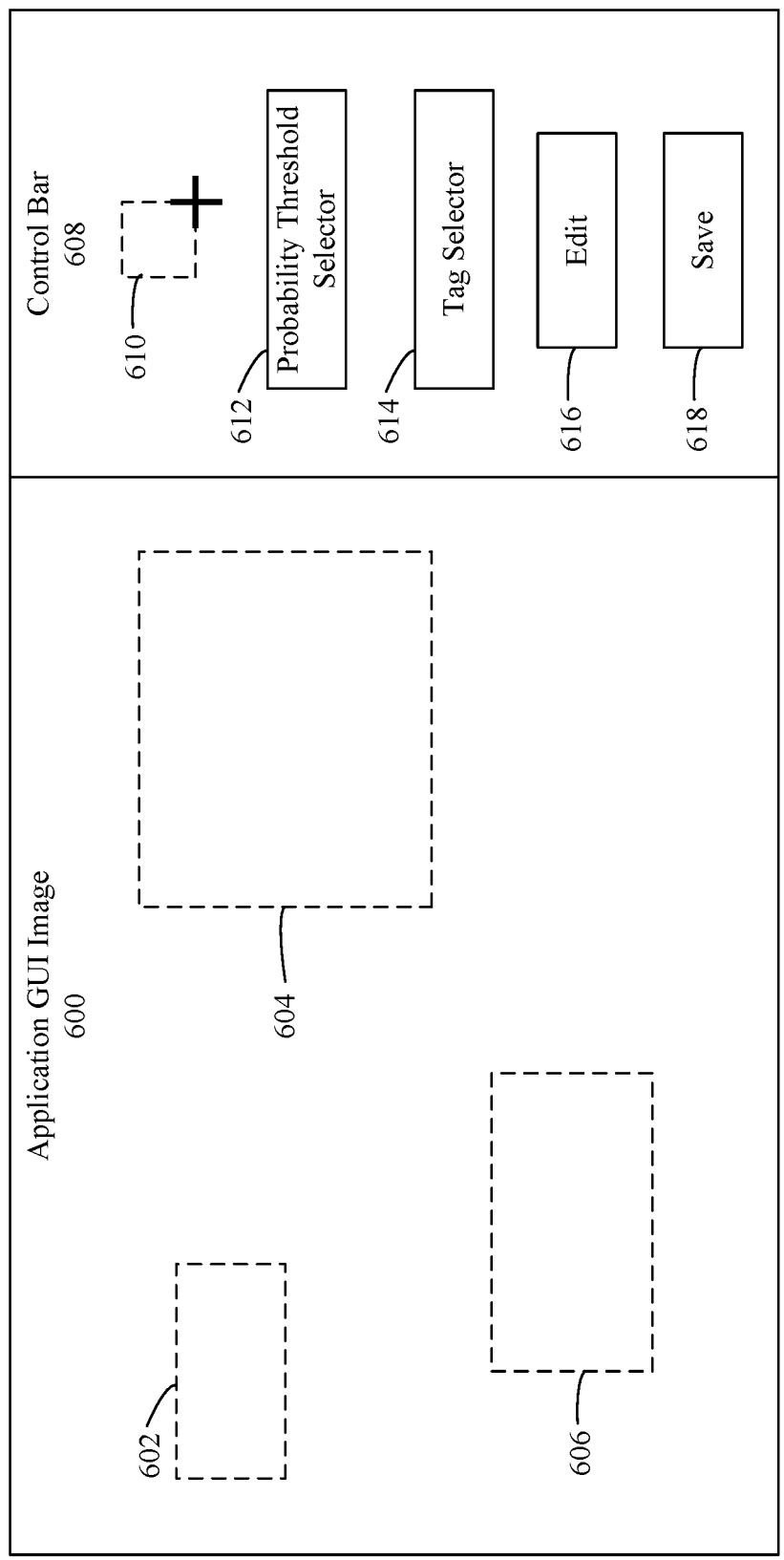
FIG. 6 shows an illustrative validator interface for tagging a region of an image, according to an example embodiment.

Validator UI 104 enabling a user to view, delete, add, move, and/or otherwise modify bounded regions of an image representing application GUI 312 may be implemented in various ways. For instance, FIG. 6 depicts an illustrative validator interface for tagging a region of an image, according to an example embodiment. As shown in FIG. 6, a validator interface may include a plurality of windows or panes, such as an application GUI image 600 and a control bar 608. Application GUI image 600 may present a particular image stored in image storage 316. As shown in FIG. 6, application GUI image 600 may also comprise one or more graphical overlays representing bounded regions 602, 604, and 606 as described herein. Although three bounded regions are illustrated in FIG. 6, any number of bounded regions may be presented as overlays in application GUI image 600. In implementations, a user may interact with application GUI image 600 and/or control bar 608 to view a region identifier associated with each bounded region. For instance, a predetermined interaction, such as clicking on a bounded region or hovering over a bounded region with a pointing device may cause application the validator interface to display the region identifier associated with the bounded image. In other examples, control bar 608 (or another window or pane not shown) may present a list of region identifiers associated with application GUI image 600.

As shown in FIG. 6, control bar 608 may include a plurality of interactive user controls which may be selected or activated with respect to application GUI image 600. For instance, control bar 608 may include a region selector 610, a probability threshold selector 612, a tag selector 614, an edit control 618, and a save control 618. Region selector 610, when activated, may enable the selection of any of bounded regions 602, 604, or 606 such that the selected region may be shrunk, enlarged, moved, etc. based on an actual location of the object that the selected region is intended to bound. In other examples, region selector 610 may enable a user to identify a new region in application GUI image 600.

As shown in FIG. 6, tag selector 614, when activated, may enable the selection and/or modification of the region identifier associated with a particular bounded region (e.g., one of regions 602, 604, or 606). Tag selector 614 may include a listing of available region identifiers, an interactive search tool enabling a user to input the name of a region identifier, an interactive control to identify a new region identifier, or any other control to select an appropriate region identifier for a selected region. Edit control 616, when activated, may be configured to enable a developer to modify region information (e.g., the location of one or more regions and/or associated region identifiers) associated with application GUI image 600. Save control 618, when activated, may cause region information presented in application GUI image 600 to be saved (e.g., in image storage 316). Probability threshold selector 612, as shown in FIG. 6, may enable a user to configure a threshold value associated with a measure of confidence as described earlier. For instance, probability threshold selector 612 may enable a user to select a particular probably threshold value for certain types of objects or globally (e.g., for all objects) for which validation is to be performed.

As an illustrative example, if image tagger 308 incorrectly bounded the location of a particular object on application GUI image 600, a user may modify the bounded region by activating edit control 616, moving or resizing the appropriate region in application GUI image 600, and activating save control 618 to save the region bounding information for application GUI image 600. In another illustration, if image tagger 308 incorrectly identified a region identifier associated with a particular one of bounded regions 602, 604, or 606, a user may interact with tag selector 614 to identify the correct region identifier associated with the selected region.

It is noted that the controls depicted in FIG. 6 are illustrative only and not intended to be limiting in any way. A validator interface may include fewer interactive elements shown in FIG. 6 or any additional interactive elements not shown.

In the above manner, baseline training data may be generated, reviewed, and confirmed for accuracy during an initial execution of test script 302 that model generator 324 may obtain 338 to train model 326 (or a subsequent execution in which one or more GUI modifications are intentionally introduced to application GUI 312, as described later). Once such baseline training data is confirmed for accuracy, such as through validator UI 104 as described herein, model generator 324 may train model 326 using a supervised learning algorithm with the images and tagged regions. For instance, model generator 324 may train model 326 based on hundreds, or even thousands, of bounded regions and associated region identifiers across hundreds or thousands of images representing application GUI 312.

Furthermore, even where hundreds or thousands of images may need to be manually validated, such as during an initial execution or in a subsequent execution which intentionally introduces GUI changes, validator UI 104 may be implemented across a plurality of machines or interfaces such that images may be verified by a larger group of developers, or even non-developers in some example embodiments, to further increase the efficiency of interface validation system 108 and reduce an overall engineering cost.

By employing a supervised training algorithm to train model 326 using verified regions that may be confirmed for accuracy, model 326 may be enabled to accurately classify graphical objects in images to validate a GUI. Additionally, since model 326 may be trained at the object level, model 326 may still effectively classify graphical objects using the training data even if the graphical object in an image appears in a different location, comprises a different size or color, and/or contains other noise (e.g., different alphanumeric characters, such as in a completion list that may include different selectable options to complete a phrase or string).

Once model 326 is trained using accurate training data, test script 302 may be subsequently executed to validate application GUI 312. For instance, if a developer makes changes to application 310 (e.g., by altering code or other program information associated with application 310), test script 302 may be executed to validate application GUI 312 in an automated manner confirm that the GUI is performing as intended. In one example embodiment, a developer may initiate the automated validation of revised version of application 310 by submitting a pull request (e.g., via computing device 102) to interface validation system 108, causing the application and test script 302 to be launched. As described herein, test script 302 may automate GUI interactions, capture images at various interaction points, and associate each captured image with a set of tags identifying expected objects in the image. GUI validator 112 may apply model 326 in a similar manner as previously described to determine if the images representing application GUI 312 of the revised application may be validated. If, for instance, the expected tags for each image are consistent with the graphical objects classified in each image, application GUI 312 for the revised application may be successfully validated.

In one example, a developer may introduce a change to application 310 that is not intended to have any changes to application GUI 312. For instance, a developer may introduce additional functionality in application 310, such as functionality to log execution times of application 310. In such an example, interface validation system 108 may utilize machine vision techniques described herein to automate the validation of application GUI 312 for the revised version of application 310 to ensure that the revised application (and as a result, the updated GUI) conforms to one or more baseline versions that were previously validated, and in some cases verified through validator UI 104. Any unintended or undesirable effects on application GUI 312 may thereby be detected quickly, and if necessary, corrected by the developer (e.g., by further revising application 310 to address the unintended GUI change) and new images of the GUI may be captured for validation upon appropriate correction to application 310. In other instances, such as where a validation has failed but a developer determines that the GUI behavior still conforms to a validated baseline upon reviewing associated validation failure information, validator UI 104 may enable a developer to manually update information relating to the validation failure, such as manually validating one or more captured images that resulted in the failure. In this manner, model generator 324 may revise or refine model 326 based on such updated training data, further improving the accuracy of model 326 for subsequent applications.

In another example, such as where application 310 is modified to intentionally introduce GUI modifications (e.g., such as introducing a new visual session or to add, remove, or modify GUI elements) from a previously validated GUI, application GUI 312 for the modified application may similarly be validated in accordance with techniques described herein. For instance, upon modifying application 310, test script launcher 110 may execute the modified application 310 and test script 302. GUI interactor 304, image capturer 306, and image tagger 308 may be executed against a revised version of application GUI 312 in a similar manner as previously described. In some further example embodiments, GUI interactor 304, image capturer 306, and image tagger 308 may also be revised to include additional automated interactions for which image captures are desired to validate one or more new GUI features. However, since GUI modifications have been intentionally introduced that have not been previously validated, the validation of one or more images of the revised GUI may fail because model 326 has not yet been trained to classify one or more updated graphical objects in the revised GUI. In this example, validator UI 104 may enable the developer to validate the new images in a similar manner as described earlier to generate an updated or replacement catalog of training data that may be used by model generator 324 to retrain model 326. Once model 326 is retrained (e.g., by verifying and/or modifying bounded regions and region identifiers described herein), interface validation system 108 may be utilized to validate further revisions to application 310, or validate its GUI in one or more different operating environment, to ensure conformity across environments.

Figure 7:
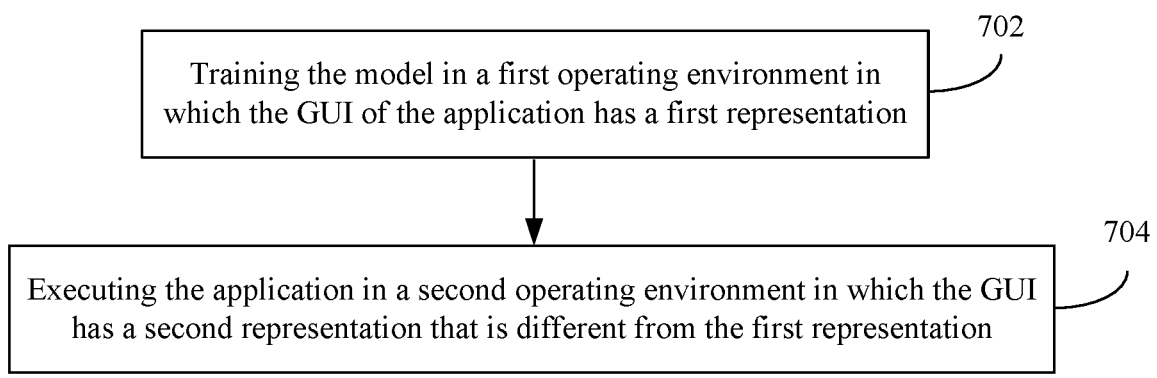
FIG. 7 shows a flowchart of a method for executing an application in a different operating environment than the environment in which a model is trained, according to an example embodiment.

In implementations, model 326 may be trained in a manner such that the same model may be applied across different platforms. For example, FIG. 7 shows a flowchart 700 of a method for executing an application in a different operating environment than the environment in which a model is trained, according to an example embodiment. In an implementation, the method of flowchart 700 may be implemented by interface validation system 108 of FIG. 3. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a model is trained in a first operating environment in which the GUI of an application has a first representation. For instance, with reference to FIG. 3, model generator 324 may train model 326 in a first operating environment. In one example, the first operating environment may comprise an environment in which regions of an image representing expected objects the image are bounded and/or verified. For instance, the first operating environment may comprise a particular platform (e.g., operating system, processor type, web browser or versions thereof), application version, locale (e.g., language, region, or other location characteristics), resolution, theme (e.g., light or dark display themes), programming language associated with application 310 (e.g., Java®, C, C++, and/or Objective-C programming languages), etc. in which application GUI 312 comprises a particular representation. In implementations, therefore, the particular representation of the GUI in the first operating environment may comprise a certain arrangement, layout, colors, etc. of graphical elements presented in application GUI 312.

In step 704, the application is executed in a second operating environment in which the GUI has a second representation that is different from the first representation. For instance, with reference to FIG. 3, test script launcher 110 may be configured to launch application 310 in a second operating environment. The second operating environment may comprise an environment in which one or more operating characteristics are different from the first operating environment. For example, application 310 may be launched in an environment that comprises a different platform (e.g., operating system, processor type, web browser or versions thereof), application version, locale (e.g., language, region, or other location characteristics), resolution, theme (e.g., light or dark display themes), and/or programming language associated with application 310 (e.g., Java®, C, C++, and/or Objective-C programming languages) than the first operating environment in which model 326 was trained. Even though operating environments may be different in an example, test script 302 may comprise one or more common sequences that are utilized for all operating platforms. For instance, GUI interactor 304 may be configured to interact with application GUI 312 in the same manner irrespective of the particular operating environment. Similarly, image capturer 306 may capture images representing application GUI 312 and image tagger 308 may tag expected objects in each such image at the same interaction points for each operating environment. In this way, despite operating environment differences, the same test procedure may be implemented for each environment in order to determine whether the applications conform to each other, or to determine whether any unintended GUI issues have resulted.

In implementations, since the first operating environment is different from the second operating environment, application GUI 312 may therefore comprise a GUI representation that may be different than the first representation in which model 326 was trained. The GUI representation of the first operating environment may be different than the GUI representation of the second operating in various ways, including but not limited to certain GUI elements being different in size, shape, color, relative locations on images representing application GUI 312. However, since model 326 is enabled to classify GUI elements at an object level, model 326 may be enabled to accurately classify GUI elements in the second operating environment based on training data from the first operating environment. In other words, model 326, once trained in a particular operating environment, may be applied generically to validate one or more application GUIs of other operating environments, such as in the case of certain applications (e.g., web applications) where the overall content and functionality of the GUI are not intended to change across different operating environments.

Since common training data may be utilized across operating environments, validation of GUIs may be automated for different environments with reduced effort. In this manner, while model is trained 326 is trained based on a particular environment, a developer may readily test application 310 across numerous different operating environments comprising different GUI representations to ensure that each operating environment's GUI representations conform to each other. If a validation for any particular operating environment fails for any reason, validator UI 104 may enable a developer to view information relating to the failed validation (e.g., by accessing the captured image or images that resulted in the failure to validate the application GUI) and make any appropriate revisions (e.g., by correcting the failed validation resulting in model 326 being retrained), and/or altering application 310 such that the GUI performs in an intended fashion. As a result, techniques described herein may enable an end-to-end regression testing solution for a GUI to quickly and accurately identify whether any code changes or execution environments have introduced undesired or unintended GUI behaviors, enabling such behaviors to be addressed more efficiently.

In some example embodiments, the same test script 302 may be executed to train model 326, such as during an initial execution, as well as to validate application GUI 312 in the same operating environment or in a different operating environment. For instance, during an initial training phase, test script 302 may be configured to be trained, such as during an initial execution of test script 302, In some other implementations, a first and second operating environment may have GUI representations that comprise one or more persistent differences, such as GUI elements that are intentionally different and/or should be validated separately. For instance, a particular operating environment including a certain web browser may comprise one or more GUI elements specific to the web browser (e.g., an icon or a badge identifying the web browser) that a developer may desire to validate for that environment, but not for other environments. In other examples, certain GUI elements (e.g., a web browser icon, button rendering, etc.) in different operating elements may be sufficiently different such that differences in the GUI elements should be validated for each such environment. In such examples, image tagger 308 may be configured to associate one or more operating environment tags, such as a platform-specific tag that is based on an executing platform of the application, with an image representing application GUI 312 for the platform. For instance, image tagger 308 may be configured to associate one or more executing platform tags with one or more captured images (or all captured images) relating to a particular executing platform, such platform-specific differences may also be validated, in addition to GUI elements that are intended to be common across executing platforms.

It is noted, however, that in some other implementations, a separate model 326 may be also be trained for separate operating environments or executing platforms as an alternative to implementing one or more platform-specific tags. For instance, model generator 324 may be configured to train a particular model based on GUI elements unique to one or more environments, while also being configured to train the model based on other training data that is intended to be common across environments (e.g., for GUI elements that are not intended to be different for different GUI representations).

III. Example Mobile and Stationary Device Embodiments

Computing device 102, validator UI 104, server 106, interface validation system 108, test script launcher 110, GUI validator 112, image storage 316, model generator 324, flowchart 200, flowchart 400, flowchart 500, and/or flowchart 700 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, validator UI 104, server 106, interface validation system 108, test script launcher 110, GUI validator 112, image storage 316, model generator 324, flowchart 200, flowchart 400, flowchart 500, and/or flowchart 700 may be implemented separately or together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
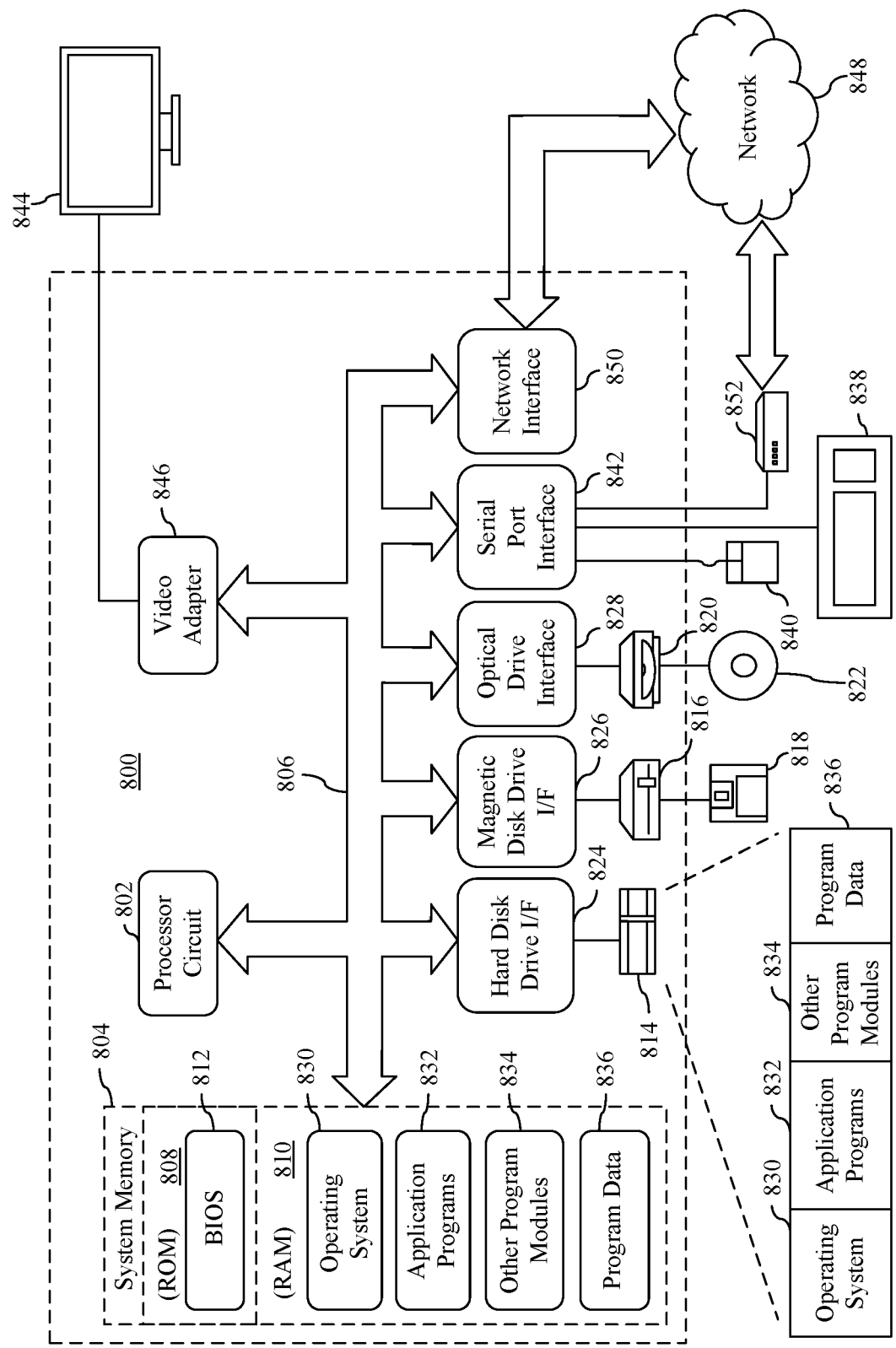
FIG. 8 shows a block diagram of an example computing device that may be used to implement example embodiments.

FIG. 8 depicts an exemplary implementation of a computing device 800 in which example embodiments may be implemented. For example, any of computing device 102, validator UI 104, Server 106, interface validation system 108, test script launcher 110, GUI validator 112, image storage 316, or model generator 324 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Example embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a compact disc (CD) ROM, digital video disc or digital versatile disc (DVD) ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing computing device 102, validator UI 104, Server 106, interface validation system 108, test script launcher 110, GUI validator 112, image storage 316, model generator 324, flowchart 200, flowchart 400, flowchart 500, and/or flowchart 700 (including any suitable step of flowcharts 200, 400, 500, or 700) and/or further example embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, micro-electromechanical systems (MEMs), nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments described herein. Accordingly, such computer programs represent controllers of the computing device 800.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for validating a GUI is disclosed herein. The system includes: one or more processors; and one or more memory devices that store program code configured to be executed by the one or more processors, the program code comprising: a test script launcher configured to: execute an application comprising the GUI; execute a test script that interacts with the GUI of the application; capture a plurality of images representing the GUI of the application at different points in time; and for each image, associate a set of tags that identify expected objects in the image; and a GUI validator configured to: for each image, apply a model that classifies one or more graphical objects in the image; and validate each image based on the associated set of tags and the classification of each of the one or more graphical objects in the image.

In one implementation of the foregoing system, the GUI validator comprises: an object detector configured to detect the one or more graphical objects in each image; and an object classifier configured to apply the model to classify each of the one or more graphical objects.

In another implementation of the foregoing system, the model is trained in a first operating environment in which the GUI of the application has a first representation; and the application is executed in a second operating environment in which the GUI of the application has a second representation that is different than the first representation.

In another implementation of the foregoing system, the set of tags for at least one image comprises a tag that is based on an executing platform of the application.

In another implementation of the foregoing system, the test script comprises a plurality of randomized interactions.

In another implementation of the foregoing system, the model is trained using a supervised learning algorithm that comprises: bounding a region of at least one of the images; and tagging the bounded region with a region identifier.

In another implementation of the foregoing system, the GUI validator is configured to validate each image based on a measure of confidence of a classification of each graphical object identified in the image.

A method of validating a GUI is disclosed herein. The method includes: executing an application comprising the GUI; executing a test script that interacts with the GUI of the application; capturing a plurality of images representing the GUI of the application at different points in time; for each image: associating a set of tags that identify expected objects in the image; applying a model that classifies one or more graphical objects in each image; and validating the image based on the associated set of tags and the classification of each of the one or more graphical objects in the image.

In one implementation of the foregoing method, the applying a model that classifies one or more graphical objects in each image comprises: detecting the one or more graphical objects in each image; and applying the model to classify each of the one or more graphical objects.

In another implementation of the foregoing method, the model is trained in a first operating environment in which the GUI of the application has a first representation; and the application is executed in a second operating environment in which the GUI of the application has a second representation that is different than the first representation.

In another implementation of the foregoing method, the set of tags for at least one image comprises a tag that is based on an executing platform of the application.

In another implementation of the foregoing method, the test script comprises a plurality of randomized interactions.

In another implementation of the foregoing method, the model is trained using a supervised learning algorithm that comprises: bounding a region of at least one of the images; and tagging the bounded region with a region identifier.

In another implementation of the foregoing method, the validating the image based on the associated set of tags and the classification of each of the one or more graphical objects in the image comprises validating the image based on a measure of confidence of a classification of each graphical object identified in the image.

A computer-readable memory is disclosed herein. The computer-readable memory includes computer program code recorded thereon that when executed by at least one processor causes the at least one processor to perform a method comprising: executing an application comprising a GUI; executing a test script that interacts with the GUI of the application; capturing a plurality of images representing the GUI of the application at different points in time; for each image: associating a set of tags that identify expected objects in the image; applying a model that classifies one or more graphical objects in each image; and validating the image based on the associated set of tags and the classification of each of the one or more graphical objects in the image.

In one implementation of the foregoing computer-readable memory, the applying a model that classifies one or more graphical objects in each image comprises: detecting the one or more graphical objects in each image; and applying the model to classify each of the one or more graphical objects.

In another implementation of the foregoing computer-readable memory, the model is trained in a first operating environment in which the GUI of the application has a first representation; and wherein the application is executed in a second operating environment in which the GUI of the application has a second representation that is different than the first representation.

In another implementation of the foregoing computer-readable memory, the set of tags for at least one image comprises a tag that is based on an executing platform of the application.

In another implementation of the foregoing computer-readable memory, the test script comprises a plurality of randomized interactions.

In another implementation of the foregoing computer-readable memory, the model is trained using a supervised learning algorithm that comprises: bounding a region of at least one of the images; and tagging the bounded region with a region identifier.

V. Conclusion

While various example embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described example embodiments, but should be defined only in accordance with the following claims and their equivalents.

What is claimed is:

1. A system for validating a graphical user interface (GUI), the system comprising:
one or more processors; and
one or more memory devices that store program code configured to be executed by the one or more processors, the program code comprising:
a test script launcher configured to:
execute an application comprising the GUI;
execute a test script that interacts with the GUI of the application;
capture a plurality of images representing the GUI of the application at different points in time; and
for each captured image, associate a set of tags that identify expected objects in the captured image; and
a GUI validator configured to:
for each captured image, apply a model that classifies one or more graphical objects in the captured image;
determine, for each captured image, whether each tag of the set of tags associated with the captured image matches one of the one or more classified graphical objects in the captured image;
for each captured image in which each tag of the set of tags associated with the captured image matches one of the one or more classified graphical objects in the captured image, successfully validate the captured image; and
for each captured image in which at least one tag of the set of tags associated with the captured image does not match one of the one or more classified graphical objects in the captured image, cause a validation of the captured image to fail.

2. The system of claim 1, wherein the GUI validator comprises:
an object detector configured to detect the one or more graphical objects in each captured image; and
an object classifier configured to apply the model to classify each of the one or more graphical objects.

3. The system of claim 1, wherein the model is trained in a first operating environment in which the GUI of the application has a first representation; and
wherein the application is executed in a second operating environment in which the GUI of the application has a second representation that is different than the first representation.

4. The system of claim 1, wherein the set of tags for at least one captured image comprises a tag that is based on an executing platform of the application.

5. The system of claim 1, wherein the test script comprises a plurality of randomized interactions.

6. The system of claim 1, wherein the model is trained using a supervised learning algorithm that comprises:
bounding a region of at least one image; and
tagging the bounded region with a region identifier.

7. The system of claim 1, wherein the GUI validator is configured to validate each captured image based on a measure of confidence of a classification of each graphical object identified in the captured image.

8. A method of validating a graphical user interface (GUI), the method comprising:
executing an application comprising the GUI;
executing a test script that interacts with the GUI of the application;
capturing a plurality of images representing the GUI of the application at different points in time;
for each captured image:
associating a set of tags that identify expected objects in the captured image;
applying a model that classifies one or more graphical objects in the captured image; and
determining whether each tag of the set of tags associated with the captured image matches one of the one or more classified graphical objects in the captured image;
for each captured image in which each tag of the set of tags associated with the captured image matches one of the one or more classified graphical objects in the captured image, successfully validating the captured image; and
for each captured image in which at least one tag of the set of tags associated with the captured image does not match one of the one or more classified graphical objects in the captured image, causing a validation of the captured image to fail.

9. The method of claim 8, wherein the applying a model that classifies one or more graphical objects in each captured image comprises:
detecting the one or more graphical objects in each captured image; and
applying the model to classify each of the one or more graphical objects.

10. The method of claim 8, wherein the model is trained in a first operating environment in which the GUI of the application has a first representation; and wherein the application is executed in a second operating environment in which the GUI of the application has a second representation that is different than the first representation.

11. The method of claim 8, wherein the set of tags for at least one captured image comprises a tag that is based on an executing platform of the application.

12. The method of claim 8, wherein the test script comprises a plurality of randomized interactions.

13. The method of claim 8, wherein the model is trained using a supervised learning algorithm that comprises:
   bounding a region of at least one image; and
   tagging the bounded region with a region identifier.

14. The method of claim 8, wherein the validating the captured image based on the associated set of tags and the classification of each of the one or more graphical objects in the captured image comprises validating the captured image based on a measure of confidence of a classification of each graphical object identified in the captured image.

15. A computer-readable medium having computer program code recorded thereon that when executed by at least one processor causes the at least one processor to perform a method comprising:
   executing an application comprising a graphical user interface (GUI);
   executing a test script that interacts with the GUI of the application;
   capturing a plurality of images representing the GUI of the application at different points in time;
   for each captured image:
      associating a set of tags that identify expected objects in the captured image;
      applying a model that classifies one or more graphical objects in the captured image; and
      determining whether each tag of the set of tags associated with the captured image matches one of the one or more classified graphical objects in the captured image;
   for each captured image in which each tag of the set of tags associated with the captured image matches one of the one or more classified graphical objects in the captured image, successfully validating the captured image; and
   for each captured image in which at least one tag of the set of tags associated with the captured image does not match one of the one or more classified graphical objects in the captured image, causing a validation of the captured image to fail.

16. The computer-readable medium of claim 15, wherein the applying a model that classifies one or more graphical objects in each captured image comprises:
   detecting the one or more graphical objects in each captured image; and
   applying the model to classify each of the one or more graphical objects.

17. The computer-readable medium of claim 15, wherein the model is trained in a first operating environment in which the GUI of the application has a first representation; and
   wherein the application is executed in a second operating environment in which the GUI of the application has a second representation that is different than the first representation.

18. The computer-readable medium of claim 15, wherein the set of tags for at least one captured image comprises a tag that is based on an executing platform of the application.

19. The computer-readable medium of claim 15, wherein the test script comprises a plurality of randomized interactions.

20. The computer-readable medium of claim 15, wherein the model is trained using a supervised learning algorithm that comprises:
   bounding a region of at least one image; and
   tagging the bounded region with a region identifier.

* * * * *